UNITED STATES PATENT OFFICE.

LOUIS T. FREDERICK, OF WILKINSBURG, PENNSYLVANIA, ASSIGNOR TO WESTINGHOUSE ELECTRIC AND MANUFACTURING COMPANY, A CORPORATION OF PENNSYLVANIA.

PROCESS OF MAKING LAMINATED ARTICLES.

1,284,296. Specification of Letters Patent. Patented Nov. 12, 1918.

No Drawing. Application filed December 18, 1914, Serial No. 877,979. Renewed October 2, 1918. Serial No. 256,627.

*To all whom it may concern:*

Be it known that I, LOUIS T. FREDERICK, a citizen of the United States, and a resident of Wilkinsburg, in the county of Allegheny and State of Pennsylvania, have invented a new and useful Improvement in Processes of Making Laminated Articles, of which the following is a specification.

My invention relates to the manufacture of shaped bodies of laminated material, and it has special reference to the manufacture of rods, cylinders and other shaped articles from laminated material composed of paper or other absorbent sheet material held together by means of an adhesive substance.

The object of my invention is to provide a simple and expeditious process for molding laminated articles of the above indicated character.

I shall describe my invention with particular reference to electrical insulating material consisting of layers of fibrous sheet material coated or impregnated with an adhesive which may be a phenolic condensation product such as the well known bakelite. This material is ordinarily prepared in sheet form by superposing a suitable number of sheets coated with a phenolic condensation product in its fusible condition, and the pile of sheets is then subjected to heat and pressure to transform it into a hard coherent plate, the condensation product being thus converted into its infusible and insoluble condition.

Material prepared in the manner outlined above is largely used in the electrical insulating art, and it is necessary to produce it in various shapes according to the nature of the apparatus in which it is to be employed. The usual method of making these formed articles consists in preparing a plate of the required thickness, sawing the plate into sections of the approximate size of the desired article and finally shaping the sections with tools. For example, cylindrical rods are ordinarily made by sawing the plate into strips and turning the strips to the desired form in a lathe.

According to my present invention, I shorten the process of manufacturing rods and other shaped articles of the above-indicated character by so modifying the method of making the laminated plate that the bakelite or other adhesive material is still plastic when the plate is completed, so that the composite articles can be given their final form and hardness in a mold.

In carrying out one example of my process, I first superpose, in the usual way, a number of sheets of paper or other fabric coated or impregnated with bakelite or other adhesive material that is capable of being rendered hard and infusible by heat and pressure. I then subject the pile of sheets to heat and pressure sufficient to cause the sheets to adhere to one another but not sufficient to transform the adhesive material into its infusible condition. The plate thus prepared is cut or sawed into strips or other sections corresponding in size to the finished articles desired, and these sections are pressed in molds into their final shape. Heat may be applied to the molds in order to insure the complete conversion of the adhesive material into its hard and infusible form.

One advantageous application of my process is in the manufacture of insulating rods, but numerous other formed articles may be made by practising my invention. Adhesive materials other than phenolic condensation products may also be employed, and the steps of the process may be variously modified by persons skilled in the art within the scope of the appended claims.

I claim as my invention:

1. A process of making composite solid articles that comprises forming a preliminary body composed of laminations of fibrous material and a binder and molding the said laminated body by pressure applied to the sides and edges of the said laminations.

2. A process of making composite solid articles that comprises forming a preliminary body composed of laminations of fabric and a binder, and molding the said laminated body into solid cylindrical or polygonal form.

3. A process of making composite solid articles that comprises forming a preliminary body composed of laminations of fibrous material and a binder that is adapted to harden under the influence of heat and pressure, and applying heat and pressure to mold the said body into cylindrical or polygonal form and to harden the said binder.

4. A process of making rods, cylinders and the like that comprises superposing a plurality of lamintations of fibrous material treated with an adhesive material, causing the said sheets to adhere and molding the resulting material into solid cylindrical form.

5. A process of making rods, cylinders and the like that comprises superposing a plurality of laminations of fibrous material treated with an adhesive material, causing the said laminations to adhere, dividing the resulting material into sections and molding the said sections into cylindrical form.

6. A process of making rods, cylinders and the like that comprises superposing a plurality of laminations of fibrous material treated with an adhesive material capable of being hardened under the influence of heat and pressure, causing the said laminations to adhere, dividing the resulting material into sections and molding the said sections into cylindrical form.

7. A process of making rods, cylinders and the like that comprises superposing a plurality of laminations of fibrous material treated with a phenolic condensation product, causing the said laminations to adhere, and molding the said sections into cylindrical form.

8. A process of making rods, cylinders and the like that comprises superposing a plurality of laminations of fibrous material treated with a phenolic condensation product, subjecting the superposed laminations to sufficient heat and pressure to cause the said laminations to adhere without rendering the condensation product non-plastic, dividing the resulting material into sections and hot-molding the said sections into cylindrical form.

9. A process of making composite solid articles that comprises forming a rectangular body composed of laminations of fibrous material and a phenolic condensation product which has not been completely transformed into its final infusible condition, and applying heat and pressure to the sides and edges of the laminations to mold the said body into non-rectangular form and to harden the said condensation product.

10. A process of making a composite solid article that comprises forming a preliminary body of laminated material and a binder, and hot-molding said body into final form by pressure, at least part of which is applied in a direction parallel to the surfaces of the laminations.

11. A process of making a composite solid article that comprises forming a preliminary body of laminated material and a binder and hot-molding and compacting said body into cylindrical form by laterally applied pressures.

12. A process of making a composite solid article that comprises forming a preliminary body of laminated material and a binder, and transforming said body into a denser body of cylindrical or polygonal form by pressing in a heated mold conforming in shape to the finished article.

13. A process of making a composite solid cylindrical or polygonal rod that comprises forming a substantially rectangular body of laminated material and a binder, and molding said body into a more compact cylindrical or polygonal form of reduced sectional area by laterally applied pressures.

14. A solid cylinder molded from laminations of fabric and a binder.

15. A solid rod molded from flat laminations of fibrous material and a binder that is adapted to harden under the influence of heat and pressure.

16. A solid rod molded from flat laminations of fibrous material and a phenolic condensation product.

In testimony whereof, I have hereunto subscribed my name this 11th day of Dec. 1914.

LOUIS T. FREDERICK.

Witnesses:
GOLDIE E. McGEE,
B. B. HINES.